(12) United States Patent
Coleman et al.

(10) Patent No.: US 6,306,089 B1
(45) Date of Patent: Oct. 23, 2001

(54) ULTRASONIC DIAGNOSTIC IMAGING SYSTEM WITH CUSTOMIZED MEASUREMENTS AND CALCULATIONS

(75) Inventors: Michål Coleman, Everett; Jackie Lau, Redmond; Haiyuan Lu, Bothell; Jesse Jones, Seattle, all of WA (US)

(73) Assignee: ATL Ultrasound, Inc., Bothell, WA (US)

( * ) Notice: Subject to any disclaimer, the term of this patent is extended or adjusted under 35 U.S.C. 154(b) by 0 days.

(21) Appl. No.: 09/405,639

(22) Filed: Sep. 24, 1999

(51) Int. Cl.$^7$ ........................................... A61B 8/00
(52) U.S. Cl. ..................... 600/437; 128/916; 600/443
(58) Field of Search ................................. 600/437, 441, 600/443, 438; 129/916; 128/916

(56) References Cited

U.S. PATENT DOCUMENTS 5,553,620 * 9/1996 Snider et al. .......................... 600/437
5,860,924 * 1/1999 Quistgaard ............................ 600/441
5,919,138 * 7/1999 Ustuner ................................ 600/443

OTHER PUBLICATIONS

ATL Ultrasound, HDI 5000 Reference Manual, "Measurements," pp. 6–1 through 6–10; "Calculations," pp. 7–1 through 7–12, 1998.

Acuson Corporation, Sequoia General Applications Reference Manual, "Customizing Cardiac Calculations," pp. 4–1 through 4–18; "Customizing Overview," pp. 3–3 through 3–12, Jul. 1996.

* cited by examiner

Primary Examiner—Marvin M. Lateef
Assistant Examiner—Maulin Patel
(74) Attorney, Agent, or Firm—W. Brinton Yorks, Jr.

(57) ABSTRACT

An ultrasonic diagnostic imaging system is provided with an analysis package by which measurements and calculations can be made using ultrasonic image data. The analysis package includes the ability for a user to define custom exam protocols, custom measurements or custom calculations.

31 Claims, 17 Drawing Sheets

FIG. 2a

Table 1:

| Findings Group | Meas. Type | Units | Accuracy |
|---|---|---|---|
| OB | 2D Distance, | cm | xx.xx |
| GYN | 2D Area, | cm$^2$ | xxx.xx |
| General Imaging | Heart Rate, | bpm | xxx |
| Vascular | Doppler Velocity / Frequency | cm S$^{-1}$/kHz | xx.x/xxx |
| Adult Cardiology | MMode Distance, | cm | xx.xx |
| Pediatric Cardiology | MMode Time, | ms | xxx |
| | MMode Time Slope | cm S$^{-1}$ | xx.x |
| | Doppler Time Slope | cm S$^{-1}$ | xx.x |
| | Doppler Time | ms | xxx |
| | Doppler Trace | cm | xx.xx |
| OB | User EFW Equation/Table | g | xxx |

ULTRASONIC DIAGNOSTIC IMAGING SYSTEM WITH CUSTOMIZED MEASUREMENTS AND CALCULATIONS

This invention relates to ultrasonic diagnostic imaging systems and, in particular, to ultrasonic diagnostic imaging systems with image measurements and calculations which can be customized for particular clinical applications.

Ultrasonic imaging systems routinely include visual tools by which a user can measure anatomy shown in the ultrasound images and calculate values and estimations from these measurements. Since two and three dimensional ultrasound images are formed by recording the time-of-travel of ultrasonic echoes and the velocity of ultrasonic waves in the body is well known, ultrasound images can be spatially quantified when displayed. This quantification gives rise to the ability to perform measurements and calculations of the tissue and organs shown in the images. Such measurements and calculations are quantified measures by reason of the spatially accurate dimensions and scaling with which ultrasound images can be displayed.

A typical use of such measurement and analysis tools can be found in ultrasound systems configured for obstetrical examinations. Obstetrical images can show anatomy such as the head, abdomen and limbs of the developing fetus. These anatomical features can be measured by placing drawing markers and shapes over and around the features with the measurement tools. Measurements such as lengths and areas can be determined from the markers and shapes placed or drawn on the image. Some of the measurements can be directly diagnostic such as determining from the head circumference whether a Caesarian section delivery will be necessary. The measurements can also be used to compute other attributes of the developing fetus, such as estimated gestational age and fetal weight. The ability to make these measurements and calculations thus facilitate proper care and treatment of both the mother and baby.

More sophisticated ultrasound systems, particularly those that can be configured for a variety of clinical applications, often are equipped with the ability to perform dozens of measurements and calculations. Because a clinical user will usually not employ all of the numerous measurements and calculations in his or her daily practice, ultrasound systems generally provide the capability to select only predetermined measurements and calculations to be available each time the system is utilized. The unselected measurements and calculations will still be resident in the ultrasound system for future selection, but will not be active during use of the system without modification of the selection of the measurements and calculations available.

It would be desirable for the system to have greater flexibility and versatility than simply designating a default list of measurements and calculations.

Furthermore, it would be desirable to enable the clinician to design customized protocols which include the measurements and calculations which the clinician wants to use for specific types of examinations. It would also be desirable for the clinician to be able to design custom measurements not provided by the ultrasound system, and to be able to employ standard and/or custom measurements in customized calculations of the clinician's own design, independent of measurements and calculations supplied by the system manufacturer. This would free the clinician from the restricted use of only the measurements and calculations provided with the ultrasound system and variations thereof, enabling researchers to develop their own new and more accurate measures and computations for the treatment of patients.

In accordance with the principles of the present invention, an ultrasonic diagnostic imaging system is provided with the ability to create customized diagnostic protocols, measurements, and calculations using ultrasound image data, independent of those supplied with the system. A clinician can create custom protocols which include the unique set of measurements and calculations which the clinician desires to employ in specific types of examinations. A clinician can create custom measurements with the ability to define measurement parameters such as units and precision. A clinician can create custom calculations which compute equations and formulae specifically designed by the clinician. Such custom calculations can employ standard clinical measurements or custom measurements designed by the clinician. In a constructed embodiment a capability is also provided to designate the availability of measurements and calculations for making image measurements and preparing diagnostic reports.

Figure 14:
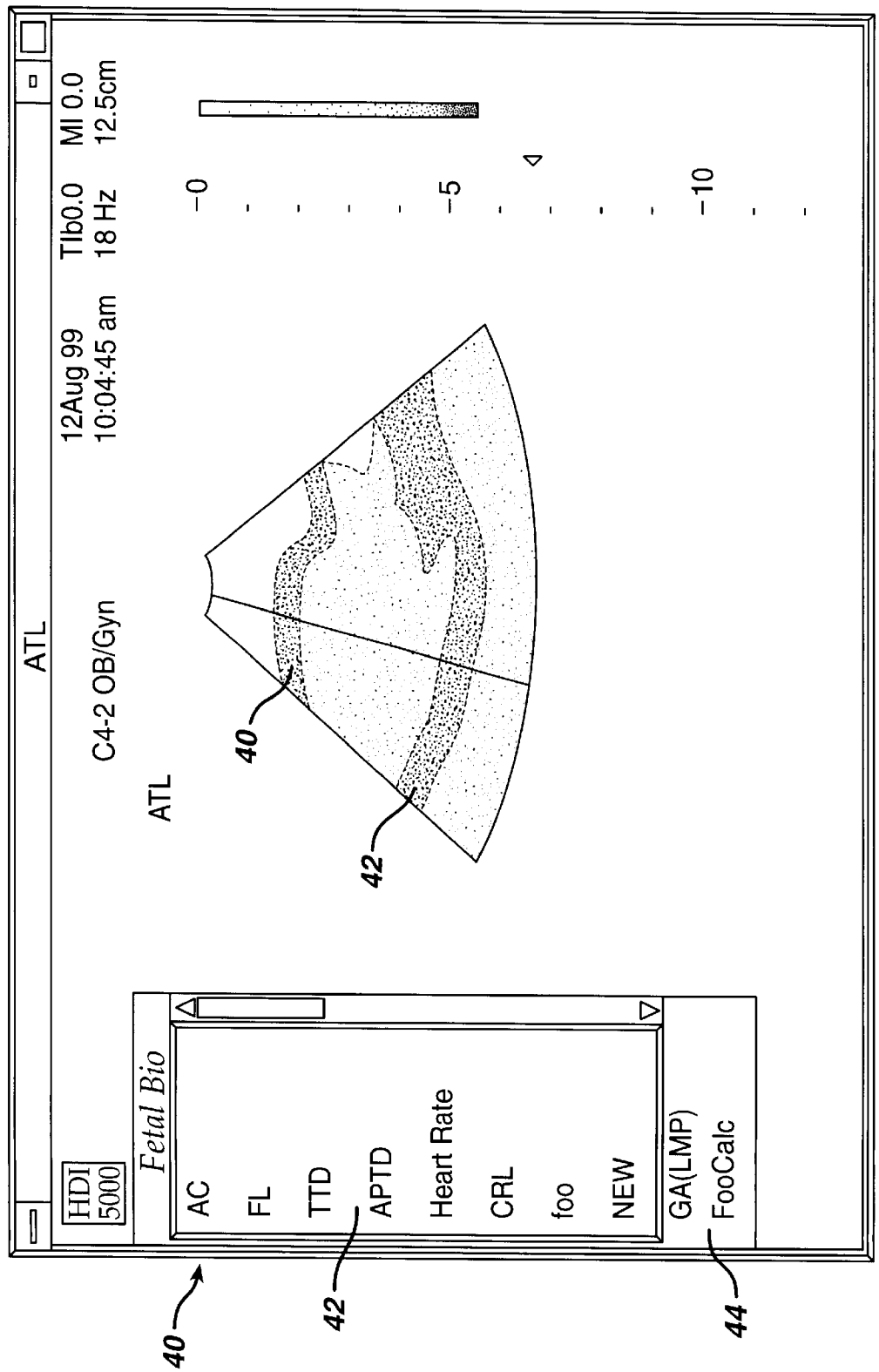

FIGS. 12, 12a–12c, and 13 illustrate the creation of a customized calculation; and FIG. 14 illustrates the use of a custom protocol with an ultrasound image.

Figure 1:
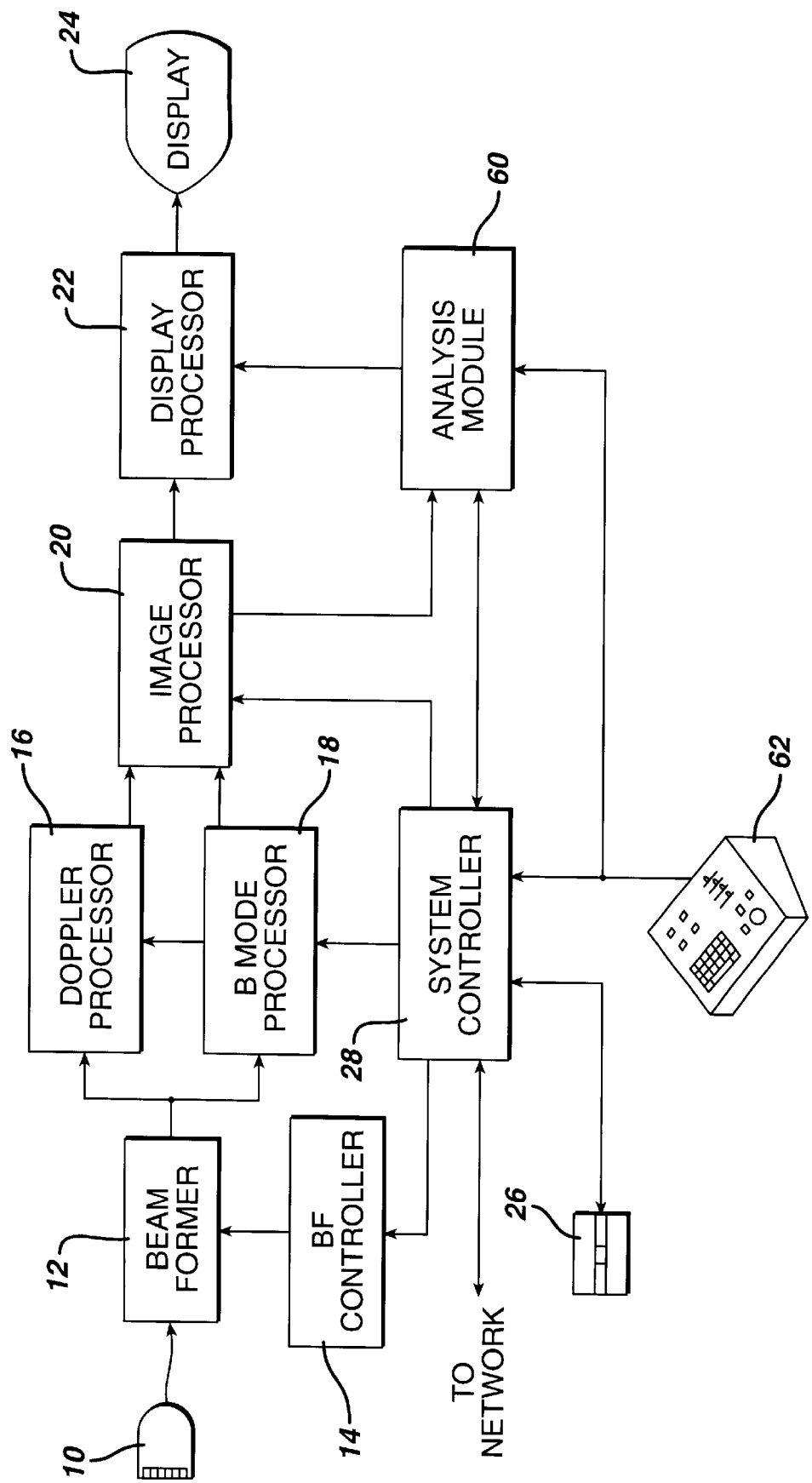
FIG. 1 illustrates in block diagram form an ultrasonic diagnostic imaging system constructed in accordance with the principles of the present invention.

Referring to FIG. 1, an ultrasonic diagnostic imaging system constructed in accordance with the principles of the present invention is shown in block diagram form. A beamformer 12 is operated under control of a beamformer controller 14 to cause an ultrasound probe 10 to transmit ultrasonic waves and receive echoes returned from the body of a patient in response to those waves. The received echoes are processed into coherent echo signals by the beamformer in association with the particular points in the body from which the echoes were returned. The spatially coordinated echoes may then be Doppler (16) and/or B mode (18) processed to form image signals of motion or tissue structure in the body. The image signals are coupled to a image processor 20 where they are processed and formatted into the desired two or three dimensional image format. Since the image processor receives both the image signals and the data specifying the spatial locations of the image signals, the resultant image is a quantified depiction of the anatomy shown in the ultrasound image. The image data is coupled to a display processor 22 which converts the image data into color and/or monochrome video signals which are then coupled to a display 24 for display of the ultrasound image.

The overall synchronization and control of the major functions of the ultrasound system is provided by a system controller 28. The system controller is responsive to control signals from a user control 62 and issues commands to the various processors of the ultrasound system to implement the type of ultrasound imaging and/or analysis requested by the user. The ultrasound system also has the capability to exchange data with external devices such as by way of a network, or by way of removable media such as the removable disk of a CD-R or M.O. disk drive 26.

In accordance with the principles of the present invention an analysis module 60 is provided which enables measurements and calculations to be made using ultrasound image data. The analysis module may be embodied in hardware, software, or both and operates on ultrasound image data provided by the image processor 20. The analysis module also receives control signals from the user control 62 which direct and command operations of the analysis module, as described below. The user control 62 preferably includes a pointing device such as a trackball, mouse or joystick by which the user can designate certain points in the ultrasound image for measurements or calculations. By using the pointing device the user can place and manipulate cursors or markers on the ultrasound image viewed on the display 24, and can place or draw outlines or shapes on the ultrasound image. Placement of markers or the drawing of shapes can be assisted by semi-automated or fully automated functions. For instance, the user may be asked to point a cursor at the endocardium of the heart and, using this input, the analysis module may automatically trace the endocardial lining of the heart. In a fully automated implementation the analysis module would automatically identify the heart chamber and trace the endocardium. With the user control the user can enter text or numerical data on or near the image, and can add or remove graphical data on or around the image. The analysis module can operate through a graphic overlay circuit of the display processor to overlay the ultrasound image with the graphic and character symbols controlled by the analysis module. The user control 62 is also used to set up and direct the analysis module 60 and the measurements and calculations made possible by the module as described more fully below.

The analysis module can be partitioned if desired between a stand-alone ultrasound system and an offline workstation or network. For instance, measurements can be made on images viewed on the ultrasound system. The images and measurements can then be sent to an offline workstation or over a network where calculations and/or reports can be generated on a workstation or other device.

Conventional ultrasound systems include analysis packages containing measurements and calculations selected by the manufacturer. Generally these measurements and calculations are standardized and are those resulting from exhaustive clinical study. Such measurements and calculations are "safe," because their validity has been established by extensive research and clinical use. However, by restricting the user to pre-packaged standard calculations and measurements and minor variations thereof, clinical research into new analysis techniques and methods is restrained; the ultrasound system can only operate within the limitations of the standard analysis tools which the manufacturer has provided. Clinicians are prevented from developing or implementing entirely new or customized measurements and calculations. Moreover, when refinements are published for standardized measurement or calculations, they cannot be implemented on existing systems without modifications by the manufacturer or service personnel. These limitations and impediments to research and improved diagnostic care are averted by use of the present invention.

The analysis package provided by the analysis module 60 provides the ability to modify and/or customize analysis protocols, measurements, and/or calculations as described below. For example Table 1 lists a number of clinical exam areas under the column headed "Findings Group," any one or more of which can be supported by an analysis package of the present invention. The examples given in the Table include obstetrical (OB), gynecological (GYN), General Imaging, Vascular, and so forth. Table 1 shows in the second column an example of a type of measurement which it may be desirable to make in each of the exemplary clinical areas. During an OB exam it may be desirable to make a 2D distance measurement of the length of a fetal femur, for instance. Such a distance measure would be quantified in centimeters of up to a maximum value of approximately 100, quantified to two decimal places (XX.XX), as shown in the Units and Accuracy columns of the Table. In a similar manner, the Heart Rate may be measured during an General Imaging exam and would be quantified in units of beats per minute (BPM) with a maximum value of 999 (xxx). Other examples are given for the other clinical areas listed in Table 1.

Figure 2:
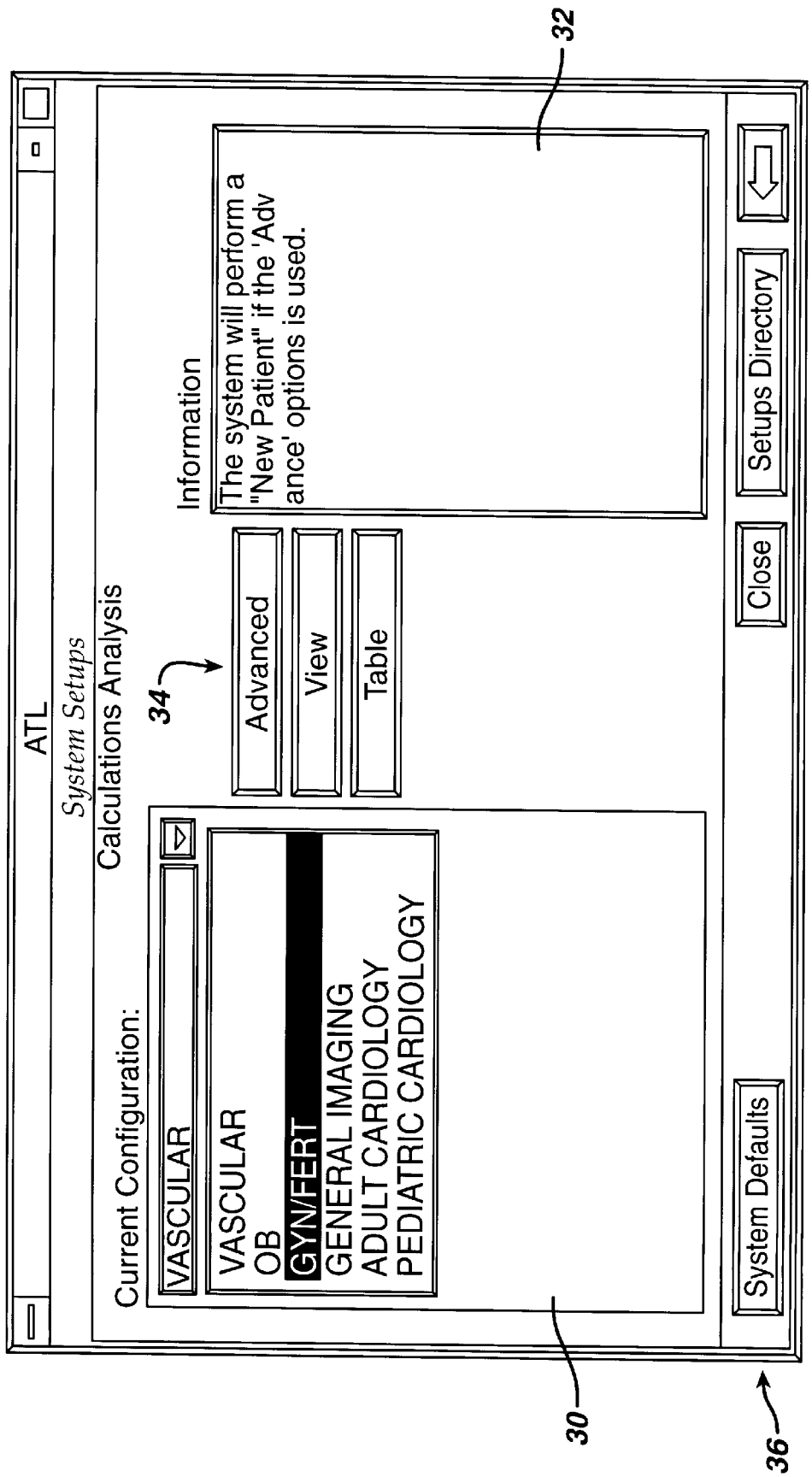
FIG. 2 illustrates an ultrasound system setup screen in which the system configuration can be designated.

With this as background, FIG. 2 illustrates a setup screen of an analysis package in a constructed embodiment of the present invention. The general layout of the setup screens described below, which are displayed on the display 24, is a clinical function box 30 on the left side of the screen, an information or choice box 32 on the right side of the screen, center control buttons 34 for selecting or operating upon information shown in the boxes 30 and 32, and common analysis package control buttons 36 along the bottom of the screen. FIG. 2 illustrates a pull down menu in box 30 by which a particular clinical exam area may be chosen. In the illustrated example the analysis package is currently configured for VASCULAR exams as shown by the top line of box 30. To the right of the current configuration is an arrow which, when clicked with the system's pointing device, pulls down the menu of clinical exam areas for which the analysis package may be configured. The clinical exam area GYN/FERT is highlighted in this example. The operator makes a selection by highlighting a desired area such as OB using the pointing device or keys on the user control 62, and the screen is updated with the operator's selection as shown in FIG. 3.

Figure 3:
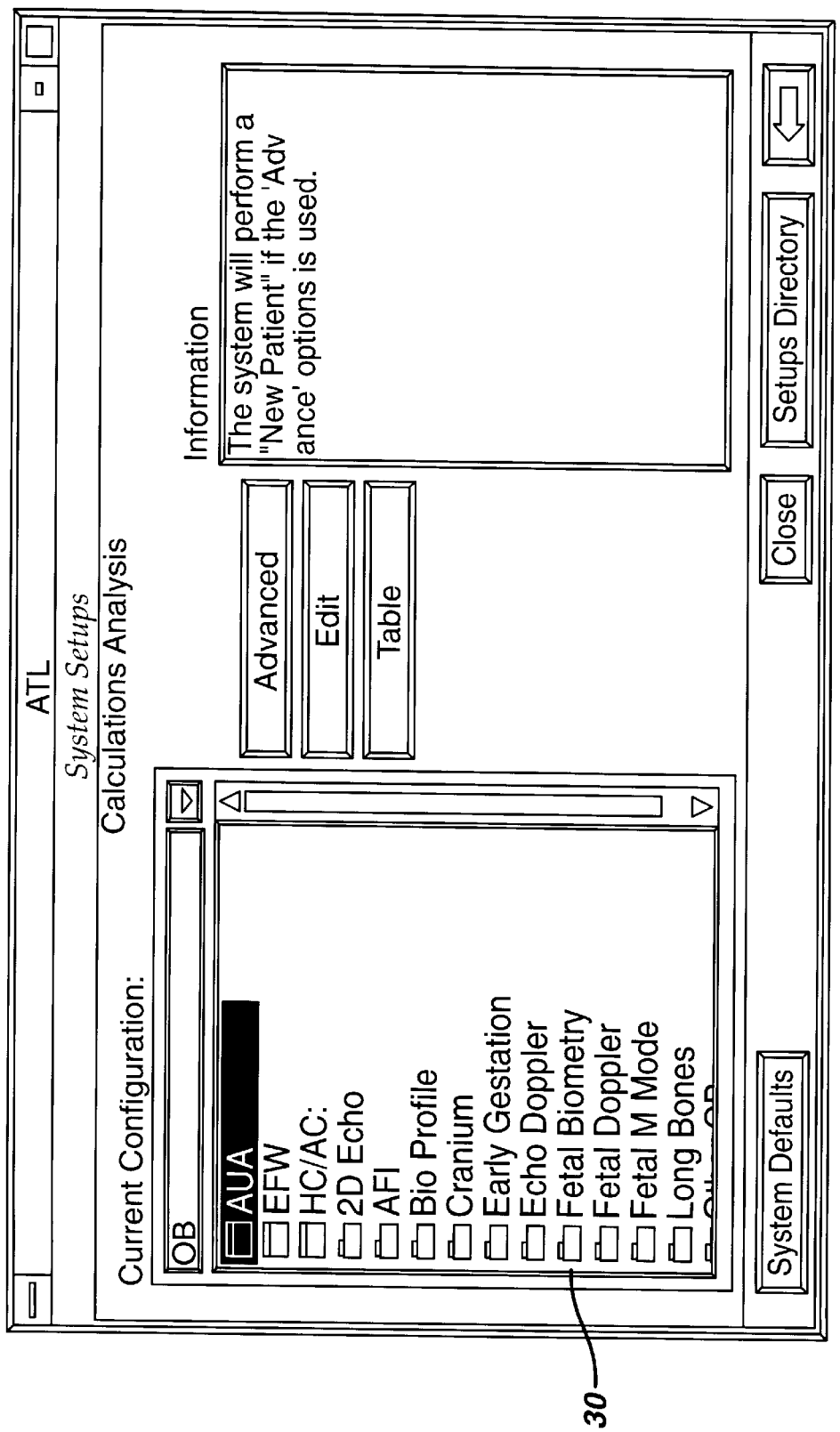
FIG. 3 illustrates an ultrasound system setup screen showing the protocols available in an obstetrical exam.

The screen of FIG. 3 shows the standard calculations and protocols available for OB exams. The three upper lines under the OB heading illustrate calculations and measurements which are common to most OB exams, including AUA (average ultrasound age), EFW (estimated fetal weight) and HC/AC (head circumference/abdominal circumference ratio). Below these calculations are a number of OB protocols such as 2D Echo, Early Gestation, Fetal Biometry, and so forth. The protocols delineate analysis steps, measurements, calculations or procedures which are followed or employed in a particular OB examination. Different users would be expected to use different ones of these protocols. For instance, a general OB practitioner would most often use the AFI (amniotic fluid index) and Bio Profile (biophysical profile) protocols. A clinic specializing in high risk pregnancies would be more likely to use Echo Doppler (bloodflow measurement) and Long Bones (measuring fetal bones) protocols. In accordance with one aspect of the present invention, measurements, calculations and protocols can be deleted from the standard system list shown in FIG. 3 by highlighting an entry, clicking the Edit button, then selecting Disable. The Edit button also allows a particular measurement, calculation or protocol to be renamed by highlighting the entry, clicking the Edit button, choosing the Rename option, then typing in the new name. When a standard system measurement, calculation or protocol is renamed, the original system entry is retained under its original name and can be recalled and reinstituted later if desired. The user also has the ability to create an entirely new protocol for addition to the list of protocols available in a particular clinical area.

Figure 4:
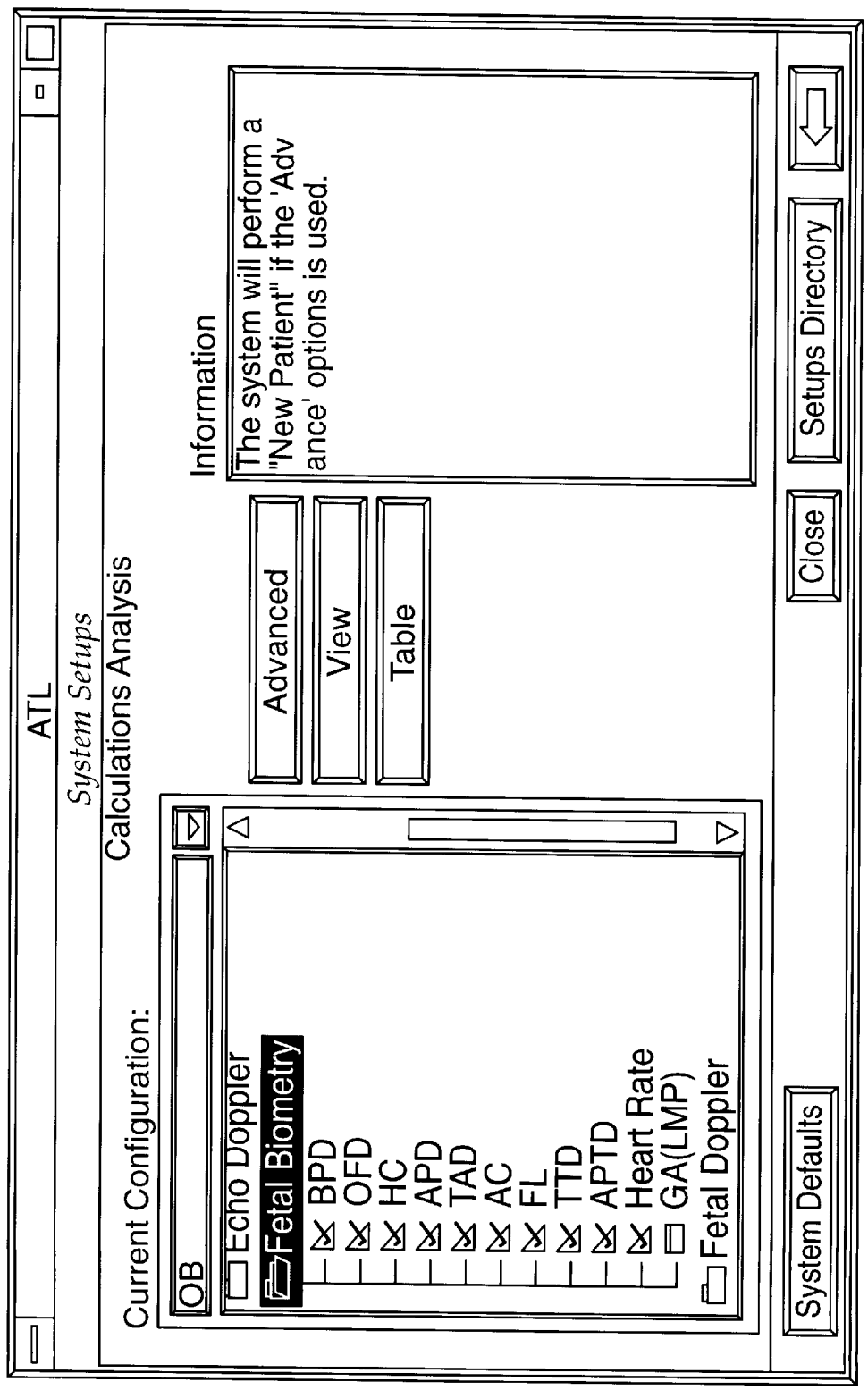
FIG. 4 illustrates the measurements and calculations available for a particular clinical protocol.
Figure 5:
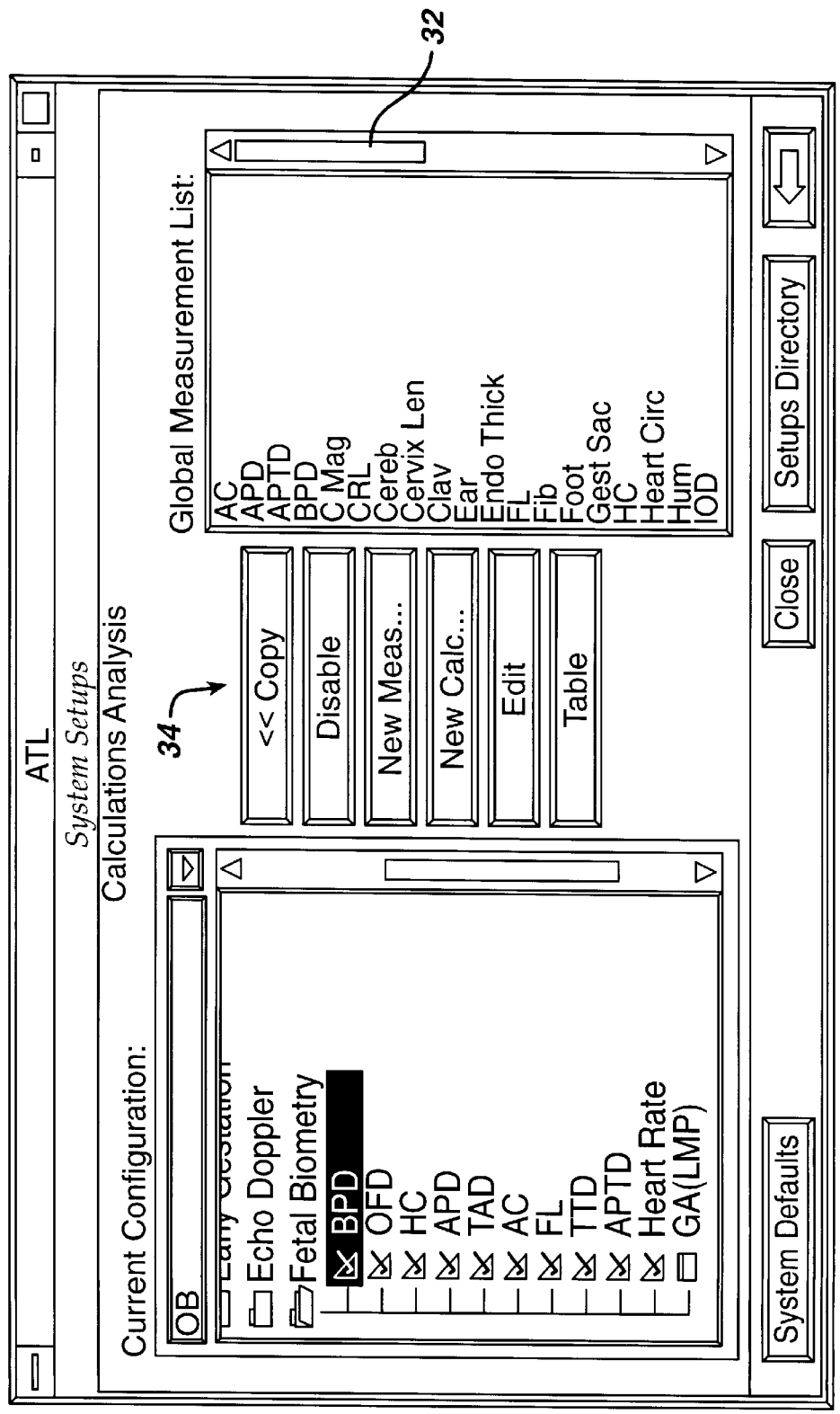
FIG. 5 illustrates a list of measurements available for addition to a particular clinical protocol.
Figure 6:
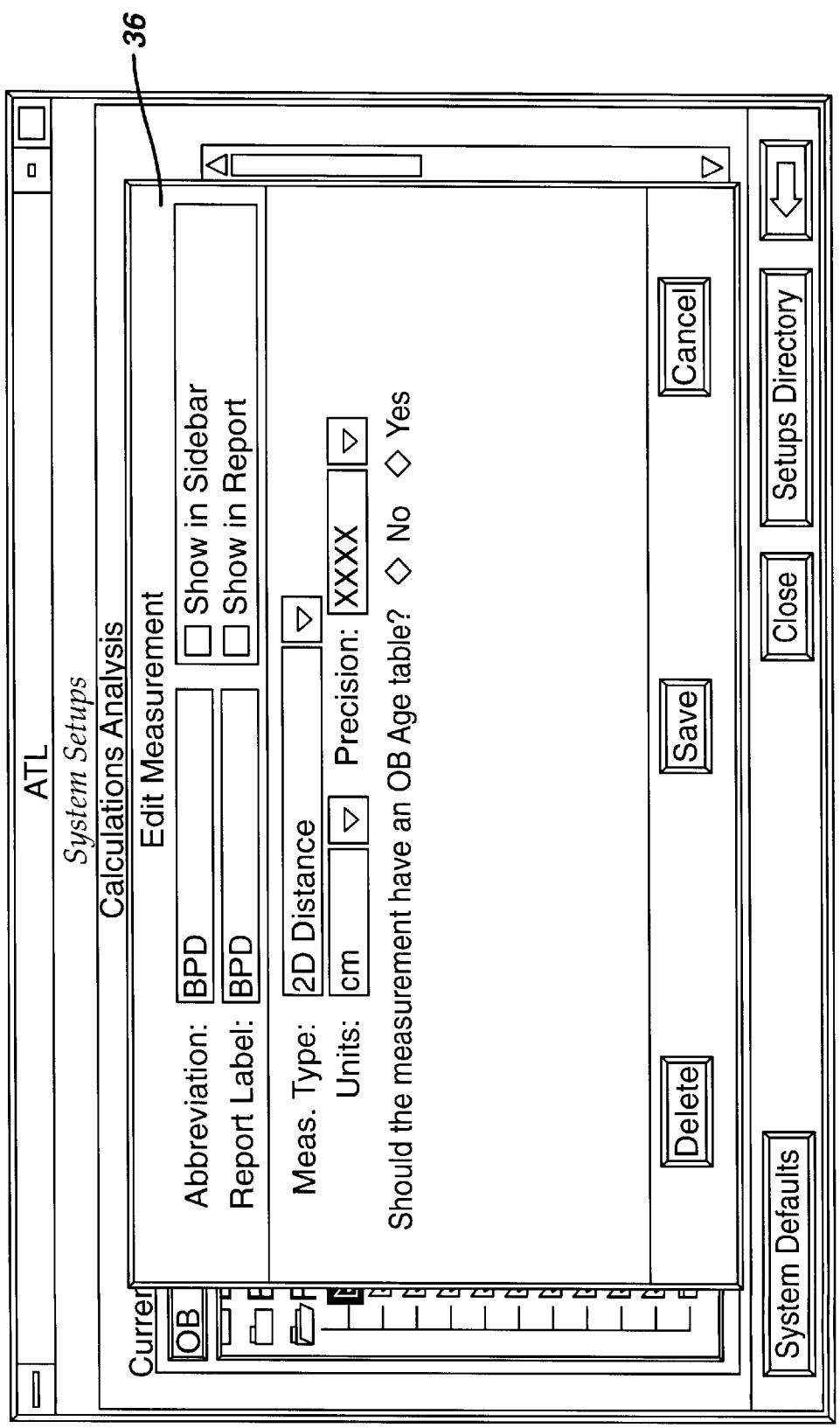
FIG. 6 illustrates a setup screen for designating how a measurement will be displayed or reported.

A protocol can also be customized as shown by the following example. By double clicking on the Fetal Biometry protocol in FIG. 3, the list of measurements and calculations included in that protocol are displayed as shown in FIG. 4. In this example the Fetal Biometry protocol includes ten measurements (BPD through Heart Rate) and one calculation (GA(LMP)). Suppose that the user of the ultrasound system does not want the EPD (biparietal diameter) measurements to appear in the Fetal Biometry report produced at the end of the exam. To eliminate BPD from Fetal Biometry reports the user first highlights the BPD measurement as shown in FIG. 5. The buttons 34 in the center of the screen now change to provide choices for modifying the BPD measurement. One of the buttons is the Edit button which, when clicked, presents the Edit Measurement screen shown in FIG. 6. The Edit Measurement screen presents information about the BPD measurement, including its Abbreviation (BPD), it Report Label as it appears in the printed report (Biparietal Diameter), the measurement type (2D Distance), its Units and its Precision. Since BPD is a standard system measure these quantifiers cannot be changed without renaming the measurement. But the choices of where the measurement appears, either in the sidebar adjacent to the ultrasound image or in the Fetal Biometry report, can be changed. In the example of FIG. 6 both display choices are selected as shown in box 36. To remove the measurement from the Fetal Biometry report, the user simply clicks on Show in Report. The Save button at the bottom of the screen is clicked to save this choice and return to the previous screen.

Figure 7:
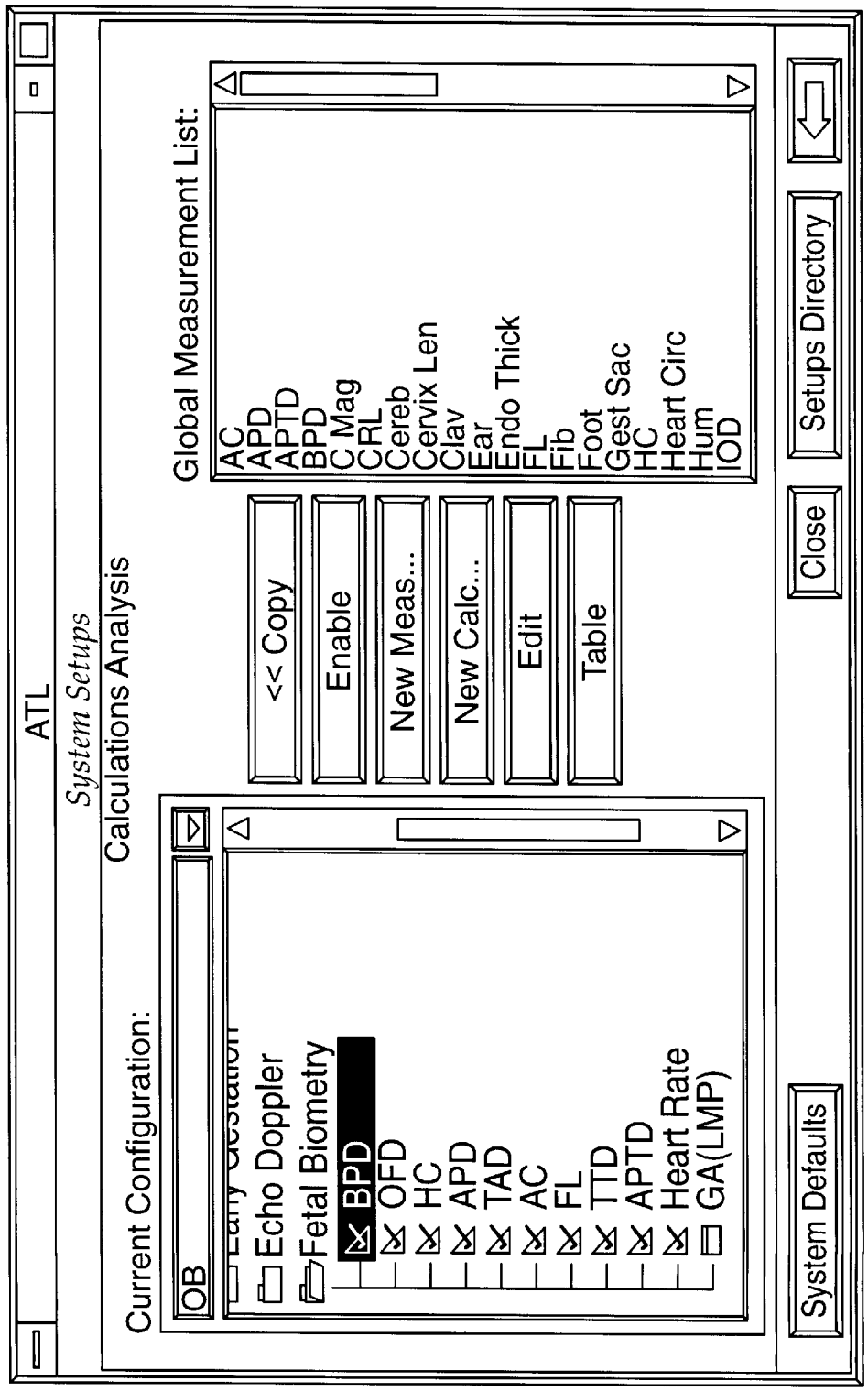
FIG. 7 illustrates the result of the deletion of a particular measurement from a given clinical protocol.

As a second example, suppose that the user wants to remove BPD measurements from the Fetal Biometry protocol. This modification to the protocol is done by first highlighting BPD as shown in FIG. 5. The second button in the center of the screen is the Disable button which, when clicked, removes BPD from the Fetal Biometry protocol. When BPD has been disabled in the illustrated embodiment it is "grayed out" in the list of Fetal Biometry measurements as shown in FIG. 7 and thereafter not available to the user in the Fetal Biometry protocol, although it continues to be available for other protocols. When BPD is disabled, the Disable button changes to an Enable button to allow the measurement to be put back in the Fetal Biometry protocol if later desired.

Figure 8:
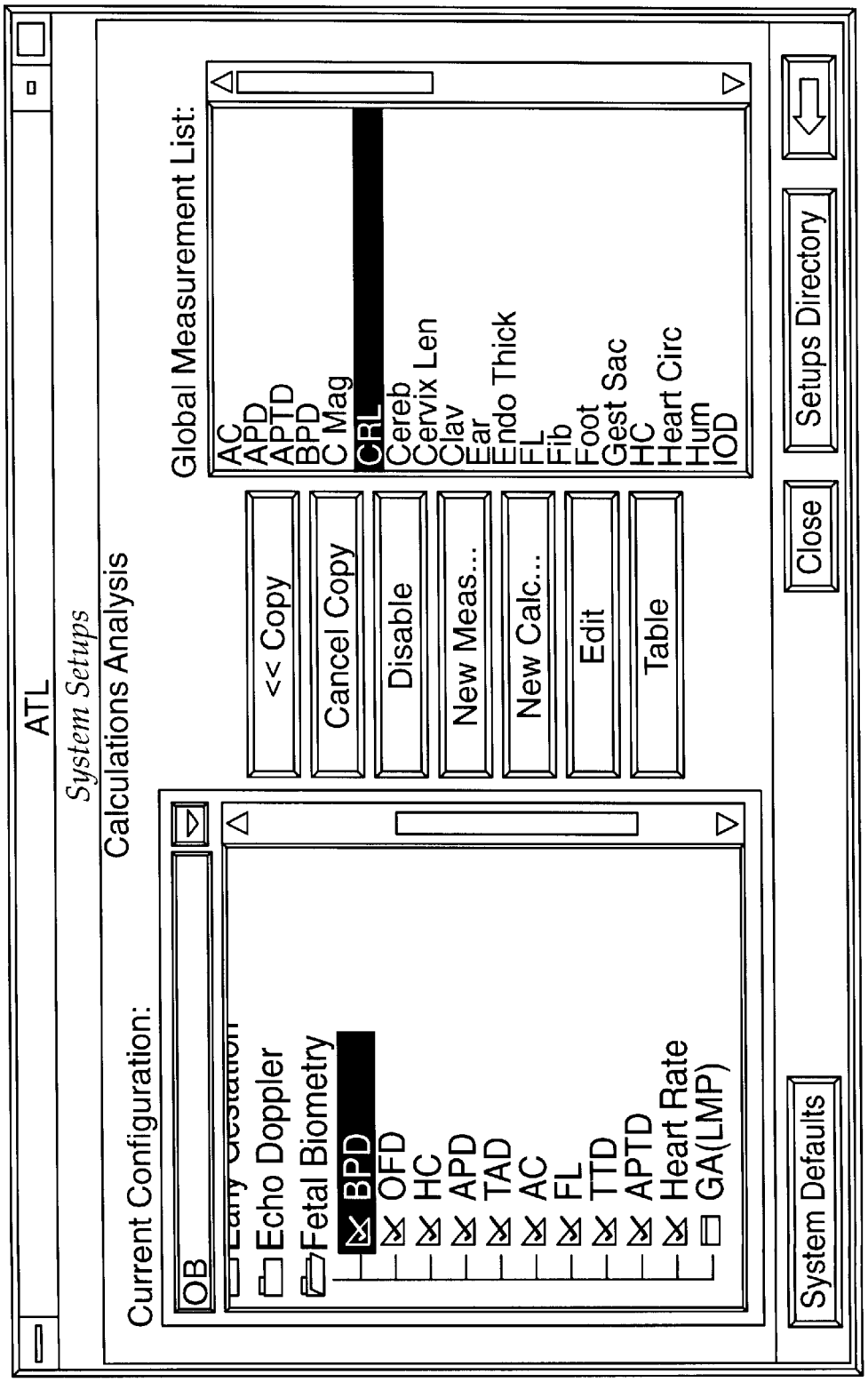
FIGS. 8 and 9 illustrate the addition of a new measurement to a given clinical protocol.
Figure 9:
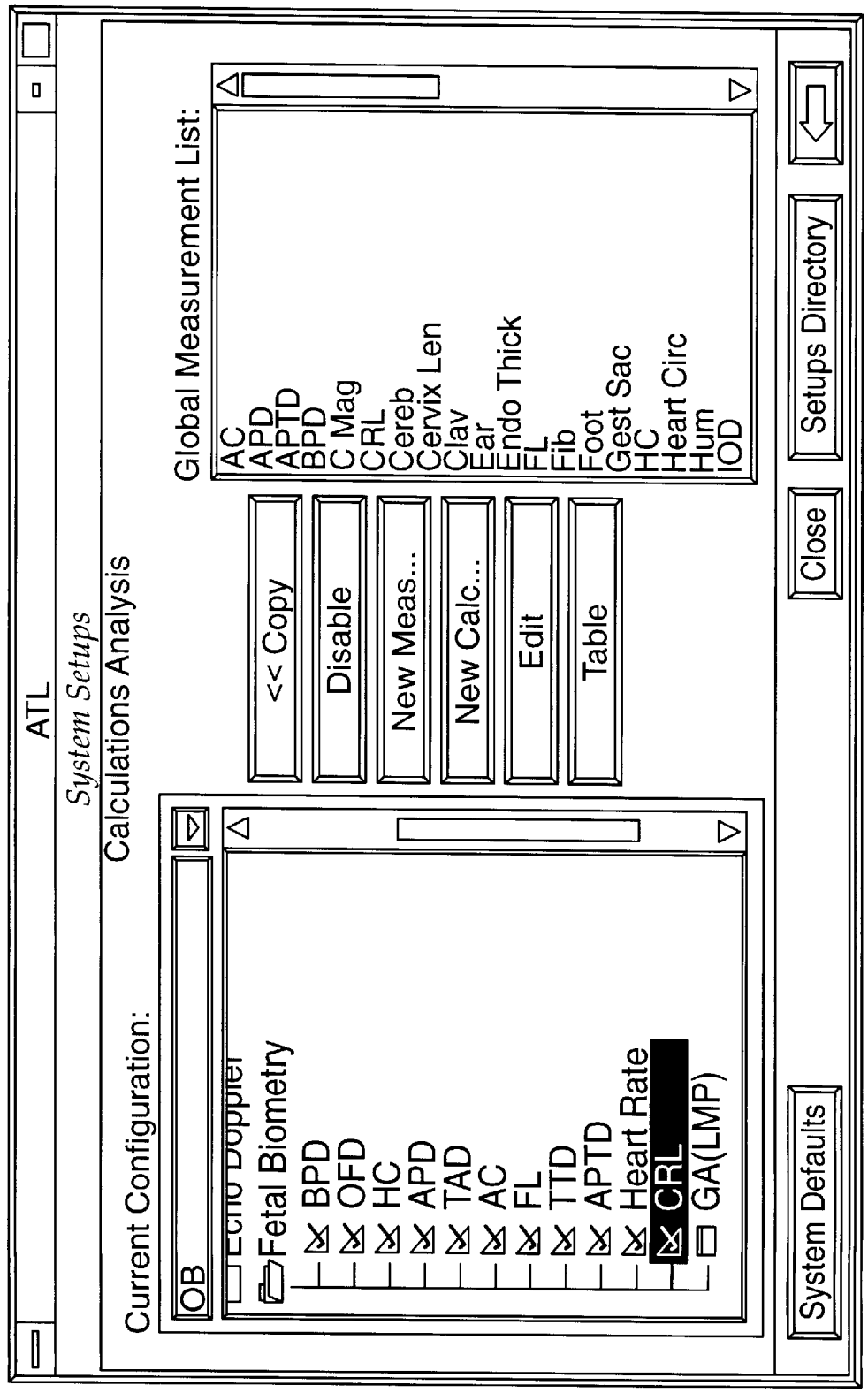

In accordance with another aspect of the present invention, additional measurements can be included in a protocol. The right box 32 in FIG. 5 shows a list of all measurements which the analysis package can currently perform, headed the "Global Measurement List." In FIG. 8 the measurement CRL (crown-rump length), which is not presently a Fetal Biometry measurement, is highlighted. Highlighting this new measurement causes the Copy button in the center of the screen to become active. By clicking on the Copy button, the CRL measurement is added to the Fetal Biometry protocol, as shown in FIG. 9. The newly added measurement can be included or excluded from reports and the image sidebar as discussed above. It can also be immediately deleted from the protocol by clicking on the Cancel Copy button shown in FIG. 8. Thus, it is seen that the user can customize any protocol by including any measurement which the analysis package can perform. As an example, the user could consolidate all of his or her fetal measurements into a single protocol such as the Fetal Biometry protocol. As another example, when a user defines an entirely new protocol, the measurements to be employed in the new protocol can be copied to the protocol by this procedure.

Figure 10:
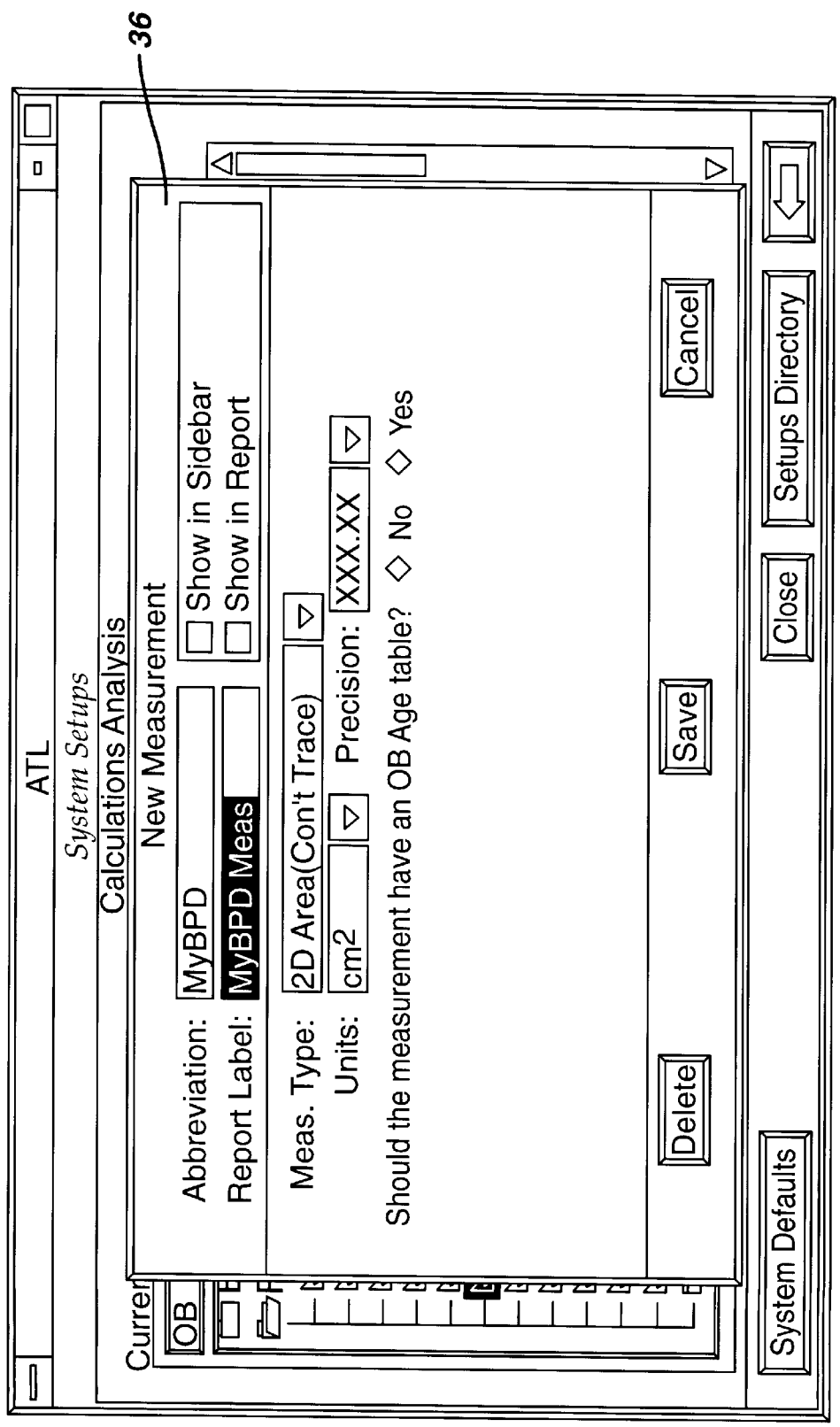
FIGS. 10, 10a, 10b and 11 illustrate the creation of a customized measurement.

In accordance with another aspect of the present invention a user can create custom measurements which are independent of those provided by the manufacturer. For example suppose that the standard BPD measurement provided by the ultrasound system manufacturer was a measure from the leading edge (outside) of one side of the fetal skull to the leading edge (inside) of the opposite side of the fetal skull. But suppose that a user believed that a BPD measurement was more accurate for his or her purposes if the skull thickness on both sides of the fetal head were included. Such a BPD measurement would be from the leading edge (outside) of one side of the fetal skull to the trailing edge (outside) of the opposite side of the fetal skull. To create this custom measurement the user clicks on the New Meas . . . button in FIG. 9 to bring up the New Measurement screen shown in FIG. 10. Because this is a user-defined custom measurement the user must define the parameters of the measurement. In FIG. 10 the user has given this custom measurement the Abbreviation MyBPD, and has specified on the Report Label line that the measurement should appear in reports as MyBPD Meas. Both choices have been selected in box 36 so that the new measurement will appear on both the image sidebar menu and in Fetal Biometry reports.

Figure 10A:
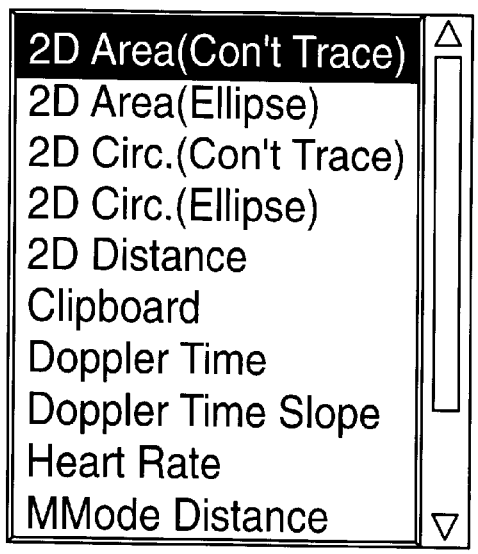
Figure 10B:
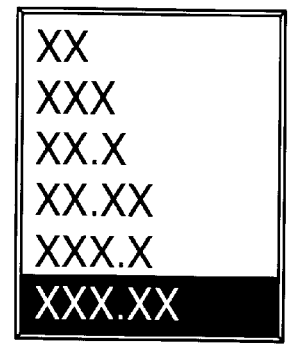

The next three parameters are chosen by pull-down menus as shown by the arrows next to the entry lines. The pull-down menu for the type of measurement, Meas. Type, is shown in FIG. 10a. Since biparietal diameter is a distance measurement, the line 2D Distance in the pull-down menu would be selected and entered for the measurement type. The Units are automatically assigned a default value by the system, based upon the chosen type of measurement. When a distance measurement is chosen the system assigns the units cm to the measurement. The user also has the option of selecting a different type of unit from a pull-down menu (not shown) which for BPD could also be mm. Area measurements would be delineated in units of cm and volume measurements of 3D images would be delineated in cm$^3$, for instance. A third pull-down menu, shown in FIG. 10b, allows a user to select the Precision in which the MyBPD measurement will be expressed, which for BPD would generally be four numerals including two decimal places.

The last line of the New Measurement screen asks "Should the measurement have an OB Age table?" One of the prime objectives of most OB exams is to estimate the gestational age of the baby from features and landmarks of the developing fetus. This inquiry asks whether the new measurement is to be linked to a calculation or table of data where it would be used for fetal age estimation.

Figure 11:
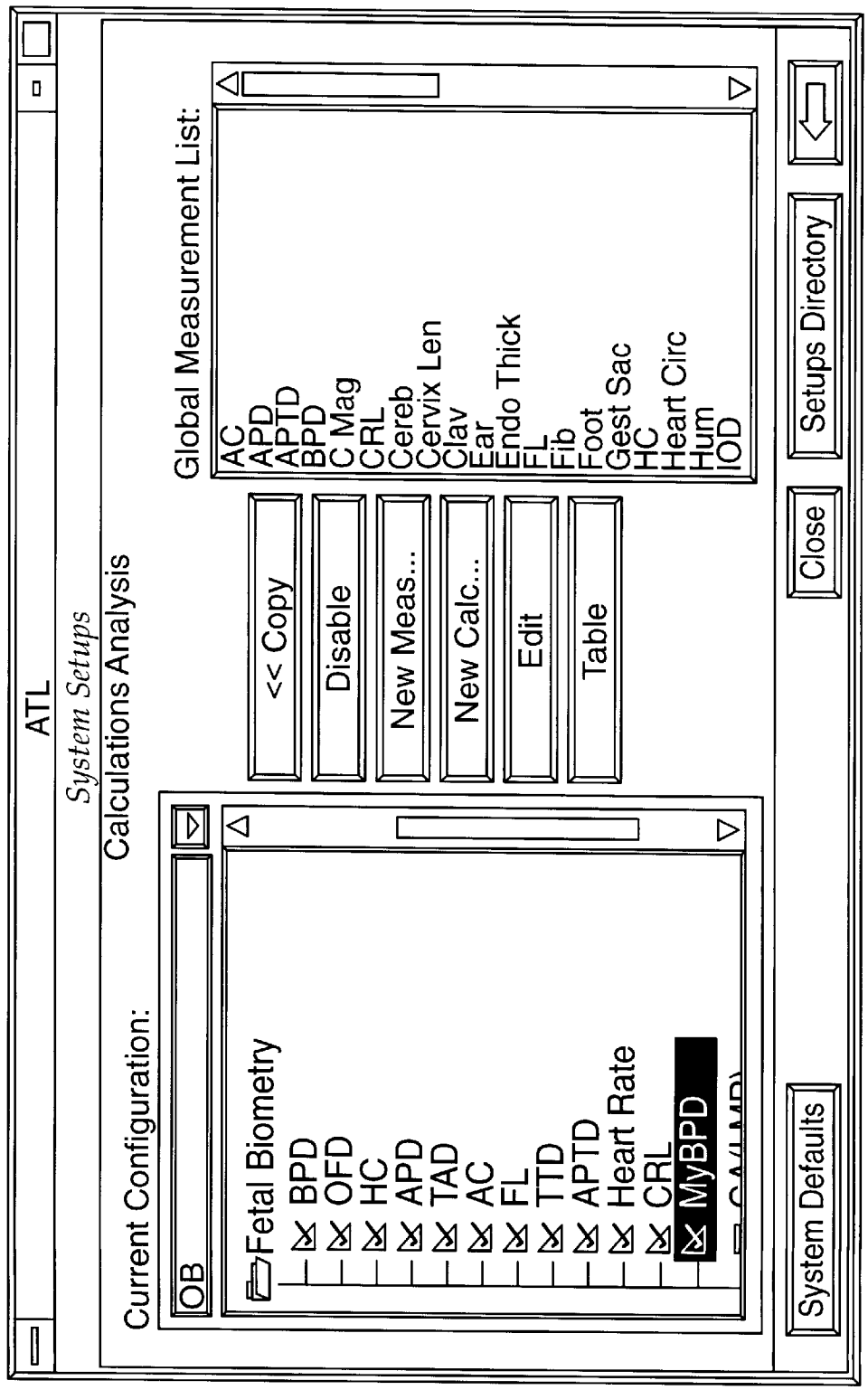

After the user has defined the parameters of the new measurement the user clicks the Save button to save the new measurement. The result in this example is that the new measurement MyBPD is now available for use during the Fetal Biometry protocol as shown in FIG. 11. The new measurement is also added to the Global Measurement List shown in the right box in FIG. 9, from which it is available for use in other protocols.

Figure 12:
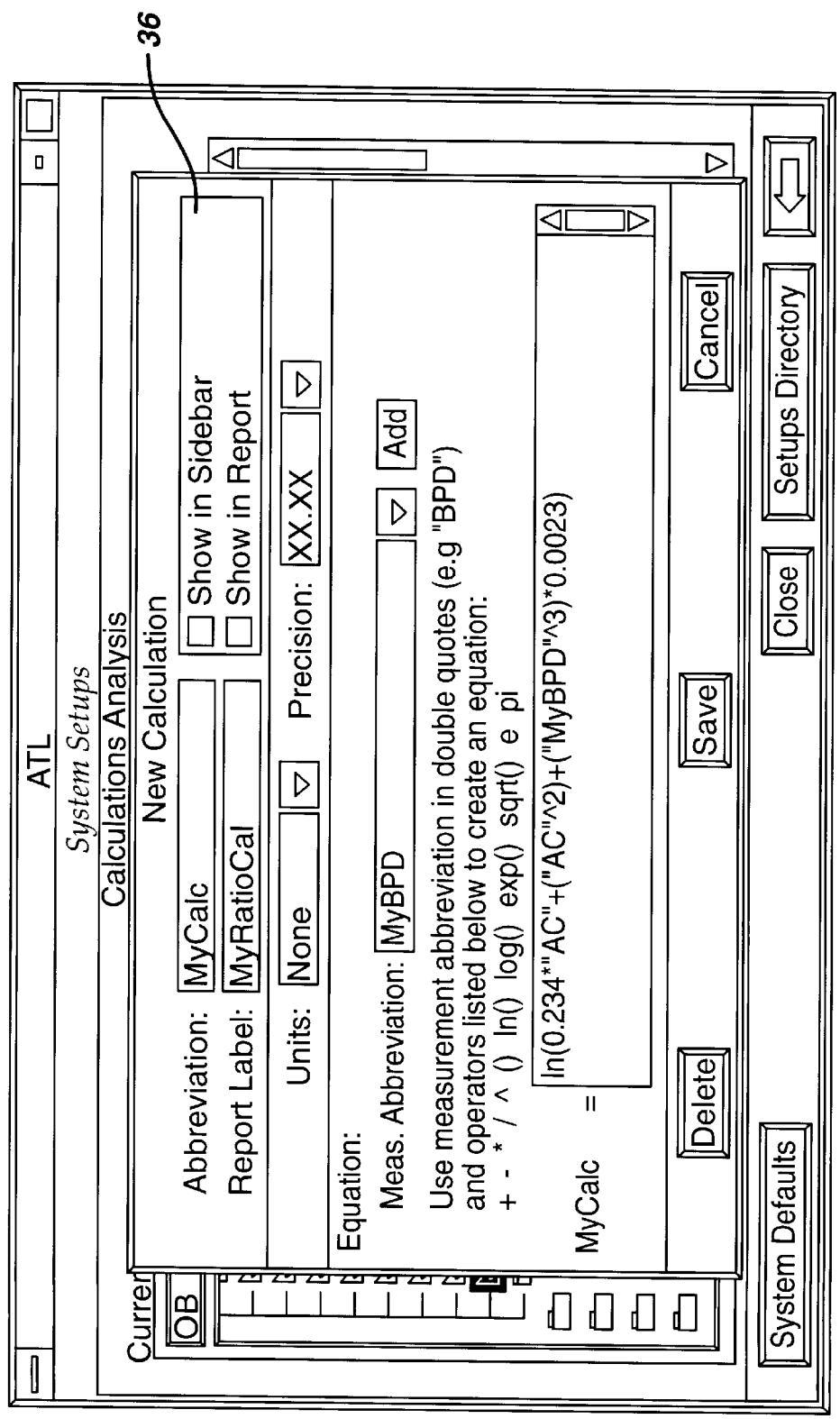
Figure 12A:
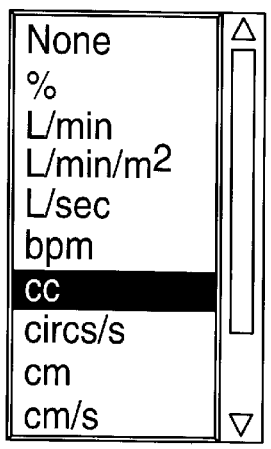

In accordance with yet a further aspect of the present invention a user can create a new calculation of his or her own design. When the user clicks on the New Calc . . . button shown in FIG. 11 the analysis package presents a New Calculation setup screen as shown in FIG. 12. The user begins by defining parameters of the New Calculation in the same manner as was done for a new measurement. In this example the user has given the new calculation the abbreviation MyCalc and has designated the report label of MyRatioCal for the calculation. As box 36 shows, the calculation is to be shown in the image sidebar and in Fetal Biometry reports. In this example the new calculation is a dimensionless ratio and therefore its units are specified as None. Other calculations may have different units, such as a custom calculation of ejection fraction or 3D measures quantified in cubic centimeters. This choice is made from the Units pull-down menu shown in FIG. 12a. The precision for the new measurement is selected from the Precision pull-down menu shown in FIG. 12c.

Figure 12B:
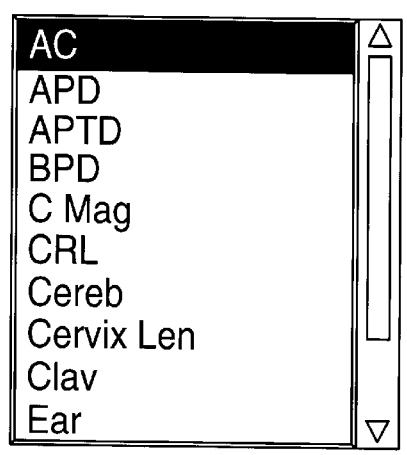
Figure 12C:
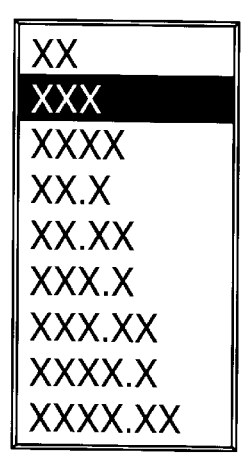
Figure 13:
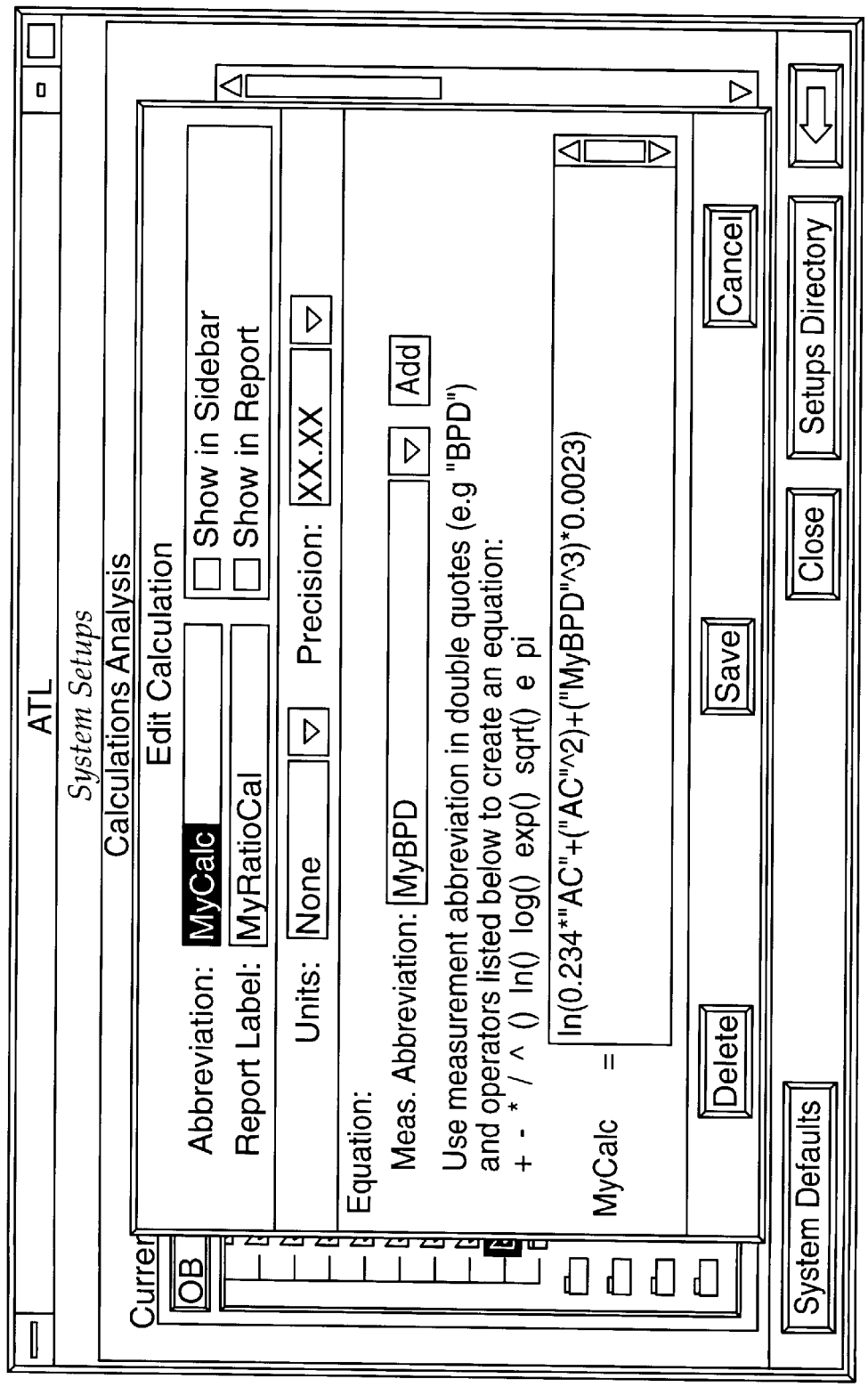

In the space below the calculation parameters the user is given an area in which to define the new calculation. The analysis package automatically displays the abbreviation of the new calculation and an equal sign to the left of the calculation area. Calculations are preferably written in equation form using familiar mathematical operators such as +,−,* , and / for addition, subtraction, multiplication and division. The present example shows other available operators for powers, logarithms, exponentials, square roots, and so forth. Logical operators can also be provided if desired. In a constructed embodiment the user is given the freedom to type in the abbreviations of measurements which are to be used in the calculation, or to insert the measurement abbreviations from a pull-down menu. When the arrow to the right of the Meas. Abbreviation space is clicked, a pull-down menu of measurement abbreviations appears as shown in FIG. 12b. In this example the previously defined new measurement MyBPD is chosen by highlighting and appears in the Meas. Abbreviation space. By clicking the Add button the measurement is inserted into the equation at the point of the equation area cursor. This capability provides an ease in dealing with equation syntax, as the measurement will be inserted in a syntactically correct form. In the illustrated embodiment the measurement variables are shown in a quotation mark format, as the equations are stored in the analysis module as XML files. New calculations can be developed entirely in the equation area and later modified by editing if desired. Calculations resident on the system can be renamed and edited to produce new calculations. When the user has completed the equation the Save button is clicked to save the new calculation MyCalc on the system. The new MyCalc calculation will, in this example, now appear in the Fetal Biometry protocol below the existing calculation GA(LMP), from which it is now available for calculation and reporting. The new calculation is also added to the Global Measurement List shown in the right box in FIG. 11, from which it is available for use in other protocols.

The user also has the ability to reorder the sequence of listed measurements and calculations in the protocol, using a simple cut-and-paste technique. The new sequence is then used when the measurements and calculations appear in a sidebar next to an ultrasonic image where the measurements and calculations are to be applied.

FIG. 14 illustrates an ultrasound image screen with an analysis sidebar panel 40. The illustrated sidebar is for the Fetal Biometry ("Fetal Bio") protocol and in an upper area 42 lists the measurements which are used in this protocol, such as CA, FL, TTD, and so forth. Toward the bottom of the list of measurements is a custom measurement which a user has created and given the abbreviation "foo." The user may make the foo measurement and the other listed measurements on the anatomy shown in the ultrasound image in the center of the screen. The user may manipulate cursors and shapes over the ultrasound image and can, for instance, measure dimensions between and around the tissue regions 40 and 42 which are shown in the ultrasound image. Below the measurement area 42 of the Fetal Bio sidebar are calculations which can be performed as part of the Fetal Bio protocol. In this example the calculations are GA(LMP), a standard system calculation, and FooCalc, a custom calculation which was named and developed by the user as described above. The custom FooCalc calculation may use the custom foo measurement and/or other measurements made in the course of the Fetal Bio exam.

The present invention takes cognizance of the fact that ultrasound systems are often transferred from one user to another, are redeployed to different departments of a hospital, or are traded in and resold. In such circumstances the new owner or user of the ultrasound system may not want the customized measurements, calculations and protocols added to the analysis module by the previous user. A constructed embodiment of the present invention therefore has the ability to restore the analysis module to its original state of operation. In a preferred embodiment restoration of the original analysis characteristics can be performed at any of three levels of hierarchy. At the protocol level the user has the option of restoring one or more customized protocols to their original state; the user could restore the Fetal Biometry protocol to the condition of the original protocol, for example. At the exam level the user has the option of restoring the original functionality of one or classes of diagnostic examination; the user could restore all protocols and functions of the OB analysis package to their original state, for example. At the system level, all customization of the analysis module is eliminated and the functions of the module are returned to their original state. The restore control may be implemented simply to disable custom protocols, measurements, or calculcations so that they can be reactivated later, or can be implemented to disable the custom functions permanently, as by deleting them from the system.

The present invention also appreciates that a user may operate any one of multiple ultrasound systems in a lab and therefore would want the customized analysis features of one system installed on others. Individually modifying each ultrasound system with the same set of custom protocols, measurement, and calculation would be a tedious, time-consuming task. In accordance with a further aspect of the present invention the parameters of the analysis protocols, measurements and calculations, including those customized by the user, are stored in a configuration file on the ultrasound system. This configuration file may be transferred to and installed on other ultrasound systems, thereby installing the modifications and customized features of one system on another system. The configuration file may be sent over a network to other ultrasound systems when the systems are connected to a network. Alternatively the configuration file may be copied onto removable media such as the disk of the disk drive 26. The disk can thereafter be removed and used to load the configuration file onto other ultrasound systems, thereby transferring customized functions to other ultrasound systems.

It is thus seen that the present invention frees researchers and clinicians from the constraints of a limited, predefined set of ultrasonic protocols, measurements and calculations. Researchers and clinicians can create new measurements, modify old calculations, or create new ones. As medical science uncovers new methods for assessing pathology and refining diagnoses, the ultrasound analysis package can be continually improved and refined correspondingly. Clinicians will no longer have to wait for an ultrasound system upgrade or a new system before practicing new diagnostic techniques, since the analysis package can be kept at the level of the state-of-the-art by the customizing techniques of the present invention.

What is claimed is:

1. An ultrasonic diagnostic imaging system comprising:
   an ultrasound image display for displaying an ultrasound image; and
   an analysis package, stored on a computer readable medium and operatively connected to said image display, which provides the ability to make image measurements, said analysis package being responsive to an analysis package control by which custom measurements can be developed for said analysis package by a user.

2. The ultrasonic diagnostic imaging system of claim 1, wherein said analysis package comprises hardware and/or software which is responsive to image data produced by said ultrasonic diagnostic imaging system.

3. The ultrasonic diagnostic imaging system of claim 2, wherein said analysis package can be configured for a particular type of diagnostic application.

4. The ultrasonic diagnostic imaging system of claim 3, wherein said type of diagnostic application is one of OB, GYN, general imaging, vascular, or cardiology.

5. The ultrasonic diagnostic imaging system of claim 3, wherein said type of diagnostic application is OB, and wherein said exam protocol is a fetal exam protocol.

6. The ultrasonic diagnostic imaging system of claim 1, wherein said custom measurements can be developed by determining one of the parameters of measurement type, units, or precision.

7. The ultrasonic diagnostic imaging system of claim 1, wherein said custom measurements can be developed by determining at least one of: whether the measurement will be available for a particular exam type, or whether the measurement will be shown in an exam report.

8. An ultrasonic diagnostic imaging system comprising:
   an ultrasound image display for displaying an ultrasound image; and
   an analysis package, stored on a computer readable medium and operatively connected to said image display, which provides the ability to perform ultrasonic exam analysis protocols for a specified clinical area, said analysis package being responsive to an analysis package control by which custom exam analysis protocols for a specified clinical area can be developed for said analysis package by a user.

9. The ultrasonic diagnostic imaging system of claim 8, wherein said exam protocol can be customized by determining measurements which are available for said exam protocol.

10. The ultrasonic diagnostic imaging system of claim 8, wherein said exam protocol can be customized by determining the sequence of measurements and/or calculations performed by said protocol.

11. The ultrasonic diagnostic imaging system of claim 1, wherein said custom measurements can be developed from pull-down menu choices.

12. An ultrasonic diagnostic imaging system comprising:
    an ultrasound image display for displaying an ultrasound image; and
    an analysis package, stored on a computer readable medium and operatively connected to said image display, which provides the ability to make calculations based upon ultrasonic image data, said analysis package being responsive to an analysis package control by which custom calculations can be developed for said analysis package by a user.

13. The ultrasonic diagnostic imaging system of claim 12, wherein said analysis package comprises hardware and/or software which is responsive to image data produced by said ultrasonic diagnostic imaging system.

14. The ultrasonic diagnostic imaging system of claim 12, wherein said analysis package provides at least one exam protocol for a diagnostic application; and
    wherein said exam protocol can be customized by determining calculations which are available for said protocol.

15. The ultrasonic diagnostic imaging system of claim 12, wherein said custom calculations comprise user-developed equations.

16. The ultrasonic diagnostic imaging system of claim 12, wherein said custom calculations can be developed by determining at least one of the parameters of units or precision.

17. The ultrasonic diagnostic imaging system of claim 15, wherein said user-developed equations can include mathematical operators.

18. The ultrasonic diagnostic imaging system of claim 15, wherein said user-developed equations can include image measurements.

19. The ultrasonic diagnostic imaging system of claim 18, wherein said user-developed equations can include custom image measurements developed by a user.

20. The ultrasonic diagnostic imaging system of claim 12, wherein said custom calculations can be developed by determining at least one of: whether the calculation will be available for a particular exam type, or whether the calculation will be shown in an exam report.

21. The ultrasonic diagnostic imaging system of claim 12, wherein said custom calculations can be developed from pull-down menu choices.

22. An ultrasonic diagnostic imaging system comprising:
    an ultrasound image display for displaying an ultrasound image derived from three dimensional ultrasonic image information; and
    an analysis package, stored on a computer readable medium and operatively connected to said image display, which provides the ability to make at least one of image measurements and calculations, said analysis package being responsive to an analysis package control by which at least one of custom measurements and calculations on three dimensional image information can be developed for said analysis package by a user.

23. The ultrasonic diagnostic imaging system of claim 22, wherein a custom measurement or calculation may use an automated or semi-automated analytical function.

24. The ultrasonic diagnostic imaging system of claim 23, wherein said automated or semi-automated analytical function comprises an image tracing capability.

25. An ultrasonic diagnostic imaging system comprising:
    an ultrasound image display for displaying an ultrasound image;
    an analysis package, stored on a computer readable medium and operatively connected to said image display and responsive to an analysis package control, which provides the ability to make at least one of custom measurements and custom calculations developed by a user;
    a data file which stores parameters of at least one of custom measurements and custom calculations; and
    an external connection by which said parameters can be transferred to another ultrasonic diagnostic imaging system, whereby said custom measurements and calculations developed on one ultrasound system can be installed in another ultrasound system.

26. The ultrasonic diagnostic imaging system of claim 25, wherein said external connection comprises a network connection.

27. The ultrasonic diagnostic imaging system of claim 25, wherein said external connection comprises a removable digital data storage medium.

28. The ultrasonic diagnostic imaging system of claim 27, wherein said a removable digital data storage medium comprises the disk of a disk drive.

29. An ultrasonic diagnostic imaging system comprising:

an ultrasound image display for displaying an ultrasound image;

an analysis package, stored on a computer readable medium and operatively connected to said image display and responsive to an analysis package control, which provides the ability to make manufacturer installed measurements or calculations and at least one of custom measurements and custom calculations developed by a user; and a restore control, coupled to said analysis package, which disables at least one of said custom measurements and custom calculations.

30. The ultrasonic diagnostic imaging system of claim 29, wherein said restore control selectively disables at least one of said custom measurements and custom calculations.

31. The ultrasonic diagnostic imaging system of claim 29, wherein said restore control disables all of said custom measurements and custom calculations.

* * * * *